United States Patent [19]
Dempsey et al.

[11] Patent Number: 5,513,925
[45] Date of Patent: May 7, 1996

[54] STRESS ABSORBING COMPOSITE FOR ROAD REPAIR AND METHOD

[75] Inventors: Barry J. Dempsey, White Heat, Ill.; Muhammad T. Mukhtar, Sargodha, Pakistan; Douglas M. Senso, Waukesha, Wis.

[73] Assignee: The Board of Trustees of the University of Illinois, Urbana, Ill.

[21] Appl. No.: 308,809

[22] Filed: Sep. 19, 1994

[51] Int. Cl.⁶ ............................................. E01C 7/00
[52] U.S. Cl. ....................... 404/17; 404/72; 404/75; 404/82; 428/63; 428/489
[58] Field of Search ................. 404/17, 45, 70–72, 404/75, 82; 405/258, 32, 270; 428/63, 489, 189, 190, 192

[56] References Cited

U.S. PATENT DOCUMENTS

| | | | |
|---|---|---|---|
| 3,891,585 | 6/1975 | McDonald | 260/28.5 |
| 4,113,401 | 9/1978 | McDonald | 404/75 |
| 4,265,563 | 5/1981 | Marzocchi et al. | 404/75 |
| 4,428,698 | 1/1984 | Murphy et al. | 404/17 |
| 4,472,086 | 9/1984 | Leach | 405/258 |
| 4,540,311 | 9/1985 | Leach | 404/72 |
| 4,637,946 | 1/1987 | Shah et al. | 428/63 |
| 4,684,288 | 8/1987 | Chapa | 404/35 |
| 4,834,577 | 5/1989 | Perfetti | 404/82 |
| 4,865,899 | 9/1989 | Reichert | 428/189 |
| 5,026,609 | 6/1991 | Jocob et al. | 428/489 |
| 5,152,633 | 10/1992 | Mercer et al. | 404/82 |

OTHER PUBLICATIONS

Transporation Research Record 1272, *Design Parameters for Use of Reinforced Stress–Absorbing Membrane Interlayers*, Thomas R. Jacob, pp. 130–138.
Highway & Heavy Construction, *Rubber Asphalt Rejuvenates Runway*, pp. 84–85, Jan. 1979.
Crafco Inc. Publication, *Crafco Over–Flex® Membrane Systems, Turning Recycled Tires Into Innovative Products* (2 pages).

*Primary Examiner*—Ramon S. Britts
*Assistant Examiner*—Pamela A. O'Connor
*Attorney, Agent, or Firm*—Dressler, Goldsmith, Shore & Milnamow, Ltd.

[57] ABSTRACT

The present invention provides a stress absorbing composite for road repair that comprises a low stiffness geotextile, a viscoelastic material disposed over the low stiffness geotextile, and a high stiffness geotextile disposed over the viscoelastic material. Also provided is a method for retarding reflective cracking in an overlay using a stress absorbing composite and a repaired road containing a stress absorbing composite.

19 Claims, 3 Drawing Sheets

5,513,925

STRESS ABSORBING COMPOSITE FOR ROAD REPAIR AND METHOD

TECHNICAL FIELD

This invention relates to a stress absorbing composite for road repair, and a method of using a stress absorbing composite to repair a distressed and cracked road surface. More particularly, this invention relates to a stress absorbing composite that helps retard reflective cracking in pavement overlays.

BACKGROUND OF THE INVENTION

Repairing a distressed and cracked road surface by applying an overlay to the road surface is well known. This method for repairing cracked roads, however, has many drawbacks, including reflective cracking, which may occur in the overlay.

When an overlay is applied over a crack or a joint in the road to be repaired, physical tearing of the overlay may take place due to various stresses to which the overlay is subjected. As a result, the crack or joint in the pavement can reflect up into the overlay and the overlay also becomes cracked above the crack or joint in the pavement. FIG. 1 shows a reflected crack in an overlay.

Reflection cracking has occurred in nearly all types of overlays, but is more common in asphalt concrete overlays placed on rigid pavements. When an asphalt concrete overlay is placed upon a rigid pavement, any movement that occurs in the underlying pavement at a crack or joint will produce stress in the overlay and can cause physical tearing of the overlay if the stress in the overlay exceeds the tensile strength of the overlay.

Movement in the underlying pavement can be caused by several factors, including seasonal temperature changes, daily temperature changes and traffic loads. For example, the low temperatures encountered during winter causes the pavement under an overlay to contract. Typically, when the pavement contracts, the cracks in the pavement widen and the stress in the overlay, which is bonded to the pavement, is proportional to the movement taking place at the site of the crack. However, the overlay also contracts in response to low temperatures. The contraction of the overlay directly above the crack provides further stress in the overlay.

In addition to seasonal temperature changes, daily temperature changes also create stress in the overlay. While the stresses in the overlay that are induced by daily temperature changes are not as great as the stresses induced by seasonal temperature changes because the temperature variations are not as extreme, daily temperature changes are more frequent.

Another source of stress in the overlay is the traffic load, which can hasten reflective cracking.

The present invention provides a stress absorbing composite that is placed over cracked pavement before an overlay is applied to the pavement. The stress absorbing composite is able to absorb and dissipate some of the stress to which the overlay would normally be subjected. Because the stress absorbing composite helps to reduce the stress in the overlay, repaired roads that use a stress absorbing composite of the present invention last longer and reflective cracking of the overlay is retarded.

SUMMARY OF THE INVENTION

The present invention provides a stress absorbing composite for road repair that comprises a low stiffness geotextile, a viscoelastic material disposed over the low stiffness geotextile, and a high stiffness geotextile disposed over the viscoelastic material.

The present invention also provides a method of retarding reflective cracking from a distressed and cracked road surface to a newly applied overlay of asphalt concrete. The method comprises the steps of positioning a stress absorbing composite that comprises a low stiffness geotextile, a viscoelastic material disposed over the low stiffness geotextile, and a high stiffness geotextile disposed over the viscoelastic material over the road surface with the low stiffness geotextile positioned adjacent to the road surface, and applying an asphalt concrete overlay over the composite. In a preferred embodiment of the invention, the stress absorbing composite is adhered to the road and the overlay using a tack coat.

Also provided is a repaired road that comprises a distressed and cracked road surface, a stress absorbing composite disposed over the road surface with the low stiffness geotextile positioned adjacent to the road surface, and an asphalt concrete overlay disposed over the composite.

DETAILED DESCRIPTION OF THE INVENTION

Figure 1:
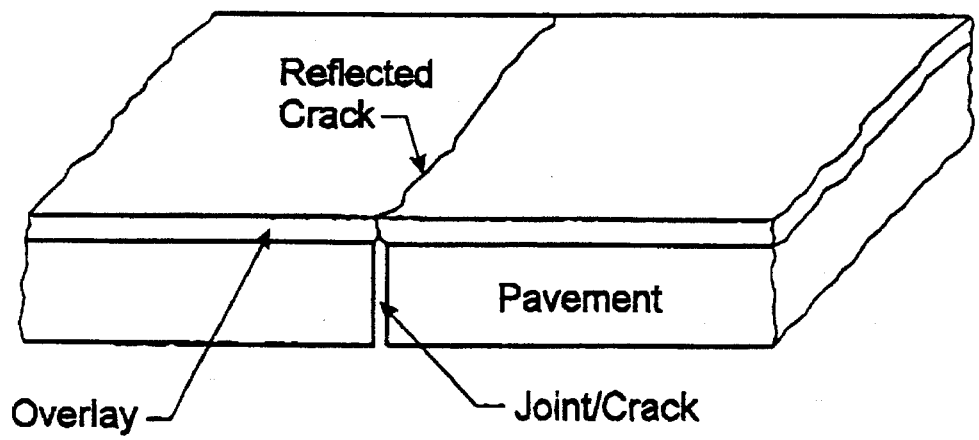
FIG. 1 shows reflection cracking in an overlay.

This invention provides a stress absorbing composite for road repair. The composite has three components: a low stiffness geotextile; a viscoelastic material; and a high stiffness geotextile.

As used herein, the term "geotextile" shall mean a permeable textile used with foundation, soil, rock, earth, or any other geotechnical engineering related material. As used herein, the term "geotextile" may be considered interchangeable with "fabrics", including woven and nonwoven fabrics. A woven fabric is a planar textile structure produced by interlacing two or more sets of elements, such as yarns, fibers, rovings, or filaments, where the elements pass each other, usually at right angles, and one set of elements are parallel to the fabric axis. A nonwoven fabric is a planar and essentially random textile structure produced by bonding, interlocking of fibers, or both, which may be accomplished by mechanical, chemical, thermal or solvent means and combinations thereof.

The low stiffness geotextile may be selected from any low stiffness geotextile that will contain the rubber asphalt, bond with the underlying pavement with the help of a tack coat and allow for sufficiently large strain at cracks in the underlying pavement so as to allow horizontal movement of the underlying pavement without breaking its bond to the underlying pavement. As used herein, the term "crack" shall include imperfections in a pavement, including but not limited to, round cracks, such as potholes, linear cracks or other imperfections having other shapes. It should be noted that potholes and other road imperfections over which a stress absorbing composite is to be used may need to be filled before application of the stress absorbing composite.

The low stiffness geotextile may be woven or nonwoven. Preferably, the low stiffness geotextile should have a stiffness less than 1500 lbs/in at 5% strain. (The stiffness of a geotextile is typically defined as the modulus of elasticity of the geotextile times the thickness of the geotextile.) ASTM D4595 provides a protocol for determining the modulus of elasticity of a geotextile. Preferred low stiffness-geotextiles include, but are not limited to, nonwoven polypropylene, polyester or other types of geotextiles. Geotextiles of various compositions and stiffnesses are known to those skilled in the art. Preferred low stiffness geotextiles include, but are not limited to, Amoco 4545, 4504 or 4506, which can be obtained from the Amoco Geotextiles & Fibers Company, Atlanta Ga.; Polyfelt TS 420 or TS 500, which can be obtained from the Polyfelt, Americas, Atlanta, Ga.; Exxon GTF 125 EX and Exxon GTF 200s, which can be obtained from the Exxon Corporation, Summerville, S.C.

In general, geotextiles are sold based on weight per square yard or based on the manufacturer's suggested applications and mechanical properties of the geotextile. For example, a 4 oz/yd$^2$ nonwoven geotextile would most likely be a low stiffness and low modulus material.

The viscoelastic material provides for a flexible bond between the low and high stiffness geotextiles, acts as stress absorbing membrane interlayer (also known as a SAMI) and allows for horizontal movement between the two geotextiles and between the overlay and the underlying cracked pavement. The function of the viscoelastic material is to absorb the strain energy produced by movement in the underlying pavement. A preferred viscoelastic material is a rubber asphalt membrane.

A rubber asphalt membrane is made from rubber and asphalt. Various composition of rubber and asphalt are known to those skilled in the art. It is preferred that the rubber is vulcanized and old tires are a good source of rubber. A useful handbook on Asphalts is *Introduction to Asphalt* published by the Asphalt Institute, College Park, Md., Sixth Edition, November 1967, which is hereby incorporated by reference. The rubber and asphalt are typically blended at a temperature of about 300° F. to about 400° F. The rubber is typically found in the membrane in the range of about 20% to about 30% by weight of the membrane, and the asphalt is found in the membrane in an amount in the range of 55% to about 75%. A filler can also be included in the rubber asphalt membrane in the range of about 5%-to about 15% by weight of the membrane. A filler is usually an inert solid that is added to the rubber and asphalt primarily to provide improved viscoelastic properties to the rubber and asphalt composition, including minimizing the variations in viscosity and elasticity that occur with changing temperatures. Preferred rubber asphalt membranes can include about 30% rubber, about 58% asphalt and about 12% filler. Another preferred rubber asphalt membrane comprises about 25% rubber, about 75% asphalt and about 5% filler. Preferred fillers include, but are not limited to, hydrated lime and calcium carbonate. It is also contemplated that other fillers that impart the desired viscoelastic properties to the rubber asphalt can be used. Examples of such fillers include polymeric materials. Preferably, the rubber asphalt membrane has an initial shear displacement modulus of less than about 2100 pounds per cubic inch.

The initial shear displacement modulus of a rubber asphalt membrane may be measured in accordance with the following protocol. Samples of a rubber asphalt membrane are prepared and sheared at 20° F. at a rate of 0.0016 inches per minute, which is typically accepted as the rate of pavement movement during daily temperature variation. A plot of the shear strength versus the horizontal displacement can be drawn and the slope of the initial part of the curve, i.e., shear stress/displacement, may be computed and is defined as the initial shear displacement modulus.

After the rubber and asphalt has been mixed, the mixture is typically cooled in the range of about 250° F. to about 300° F., and then the rubber asphalt mixture is applied to the low stiffness geotextile. Preferably, the layer of rubber asphalt on the low stiffness geotextile has a thickness in the range of about 0.125 to about 0.375 in.

It is also contemplated that other viscoelastic materials may be employed independently or in addition to the rubber asphalt membrane. For example, the viscoelastic material may comprise a polymer having the-characteristics set forth above with respect to rubber asphalt membranes.

The high stiffness geotextile may also be woven or nonwoven, synthetic or natural. Preferred high stiffness geotextiles include woven open grid polypropylene or polyester geotextiles. Typically, the high stiffness geotextiles will have a stiffness greater than 4000 lb/in at 5% strain. The high stiffness geotextile should also have a stiffness or strength that is greater than the asphalt concrete overlay. A suitable high stiffness geotextile should be able to contain the rubber asphalt, bond fully with the overlay using a tack coat and provide high stiffness and reinforcement for the overlay. Even at high stress values, the high stiffness geotextile should allow very little strain, and therefore, prevent propagation of the crack through the overlay. Preferred high stiffness geotextiles include, but are not limited to, Polyfelt Bidim Rock TT 200/50, which can be obtained from Polyfelt, Americas, Atlanta, Ga.; Huesker 200/100, which can be obtained from Huesker Incorporated, Charlotte, N.C.; and Exxon GTF 1000 T, which can be obtained from the Exxon Corporation, Summerville, S.C.

Figure 2:
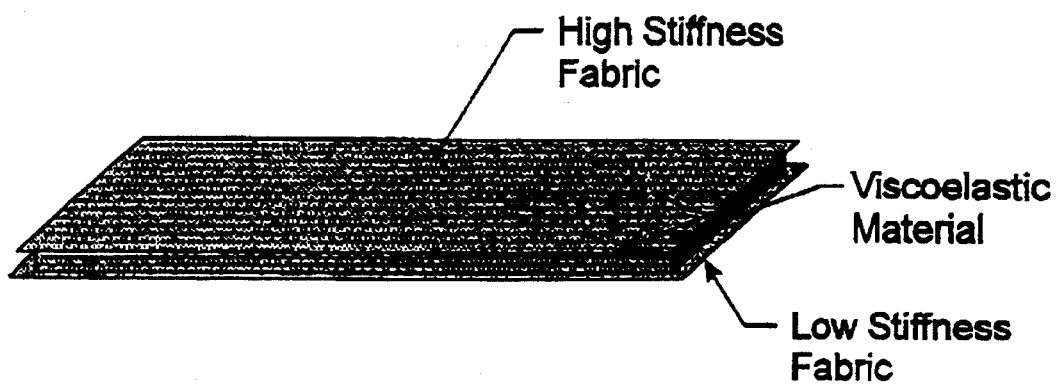
FIG. 2 shows a stress absorbing composite of the present invention.

The stress absorbing composite is made from a low stiffness geotextile, a viscoelastic material and a high stiffness geotextile. The viscoelastic material is located between the low and high stiffness geotextiles and acts to hold the geotextiles together. The viscoelastic material is disposed over the low stiffness geotextile and then the high stiffness geotextile is disposed over the viscoelastic material. FIG. 2 shows a stress absorbing composite of the present invention that is made from a low stiffness geotextile, a viscoelastic material and a high stiffness geotextile. Generally, the composite has a thickness in the range of about 3/16 to about 3/8 in.

The stress absorbing composite may be used to repair distressed and cracked road surfaces. Use of the stress absorbing composite between the pavement of the road surface and the newly applied overlay helps to retard reflective cracking. In one embodiment of the invention, a tack coat is applied to the road surface and a stress absorbing composite is placed on the road surface, preferably so that the composite completely covers any cracks in the road surface. The tack coats acts to adhere the composite to the pavement. The composite should be adhered to the pavement with the low stiffness geotextile adjacent to the road surface. Next, tack coat may be applied to the surface of the high stiffness geotextile and then the composite is covered with an overlay. The overlay may be any material used in the art for such purposes; however, concrete asphalt overlays are preferred. It is also recognized that the tack coat could be applied to the surface of the low stiffness geotextile. Alternatively, the tack coat could be applied to both the low stiffness geotextile and the road surface. In other words, the stress absorbing composite can be premanufactured. Placement consists of applying tack coat to the cracked pavement and placing the composite over the crack. It is not essential that tack coat be applied between the composite and the overlay.

The stress absorbing composite may be placed over the crack or other imperfection in the road surface to be repaired so that a portion of the stress absorbing composite extends beyond the imperfection. For example, in repairing a two inch wide crack, a stress absorbing composite having a width of 12 inches may be used. However, it may be desirable to place the stress absorbing composite over the entire road surface. For example, the stress absorbing composite may be placed as roll that covers the entire pavement.

A tack coat is used to adhere the stress absorbing composite to the old road surface and to the overlay. In general, a tack coat is a very light application of a liquid asphalt, which is applied to an existing paved surface to ensure a bond between the old surface and an overlying stress absorbing composite or the overlay. Tack coats are well known to those skilled in the art. Typically, a tack coat is applied as a very thin layer and uniformly covers the entire surface over which a stress absorbing composition or a pavement overlay is to be placed. Examples of suitable tack coats include, but are not limited to, liquid asphalts, including emulsified asphalts and cutback asphalts.

Figure 3:
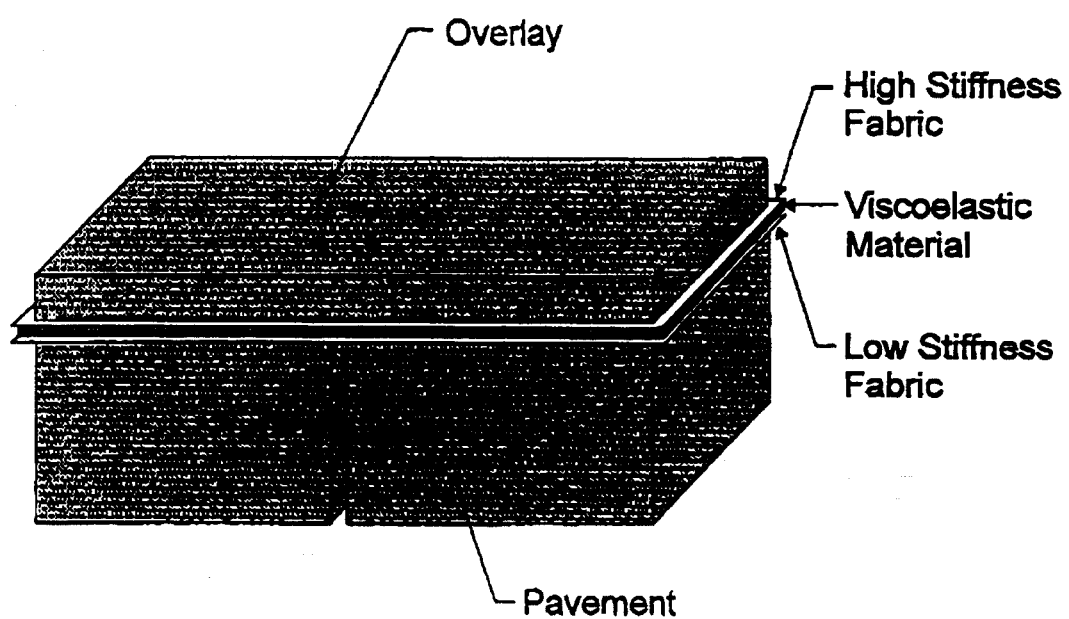
FIG. 3 shows a road that has been repaired using a stress absorbing composite of the present invention.

In another embodiment of the invention, each component of the composite could be applied to the road surface sequentially and the composite formed at the repair location. For example, the low stiffness geotextile may be adhered to the road with a tack coat. The tack coat may be applied to either the low stiffness geotextile or the old road surface or both. Next, the desired thickness of a viscoelastic material may be applied over the low stiffness geotextile. The high stiffness geotextile is then applied to the viscoelastic material. FIG. 3 shows a representation of a road that has been repaired using the stress absorbing composite of the present invention.

The following example is intended to illustrate a particular embodiment of the invention and should not be construed as limiting the specification, including the claims, in any way.

EXAMPLE

Four different systems were constructed and tested to determine the failure rate of various stress absorbing composites. All systems comprised a cracked underlying slab of Portland cement concrete, the crack or joint being about ¼ inch wide, and a 2.5 in. asphalt concrete overlay. In one system, no stress absorbing composite was placed between the cracked underlying slab and the overlay. This system served as a control. In the second system, an available stress absorbing composite called Pro-guard™ was employed between the cracked underlying slab and the overlay. Pro-guard™ may be obtained from the Pillips Fibers Corporation of Greenville, S.C. Pro-guard™ consists of two layers of geotextile with an asphalt mastic sandwiched in between. The tensile strength of Pro-guard™ in the machine direction is 300 lbs/in. and 165 lbs/in. in the x-machine direction, which can be measured according to ASTM D-882, except that the test speed was 12 inches/minute and a 1 inch initial distance between grips was used. In a third system, a 48 inch long stress absorbing composite made in accordance with the present invention was placed between the cracked underlying slab and the overlay (ISAC 48 in.). The 48 inch long stress absorbing composite extended 48 inches on either side of the crack in the underlying slab. In the fourth system, a stress absorbing composite made in accordance with the present invention was placed between the cracked underlying slab and the overlay (ISAC Full Length). However, the stress absorbing composite extended the full length of the underlying slab.

Figure 4:
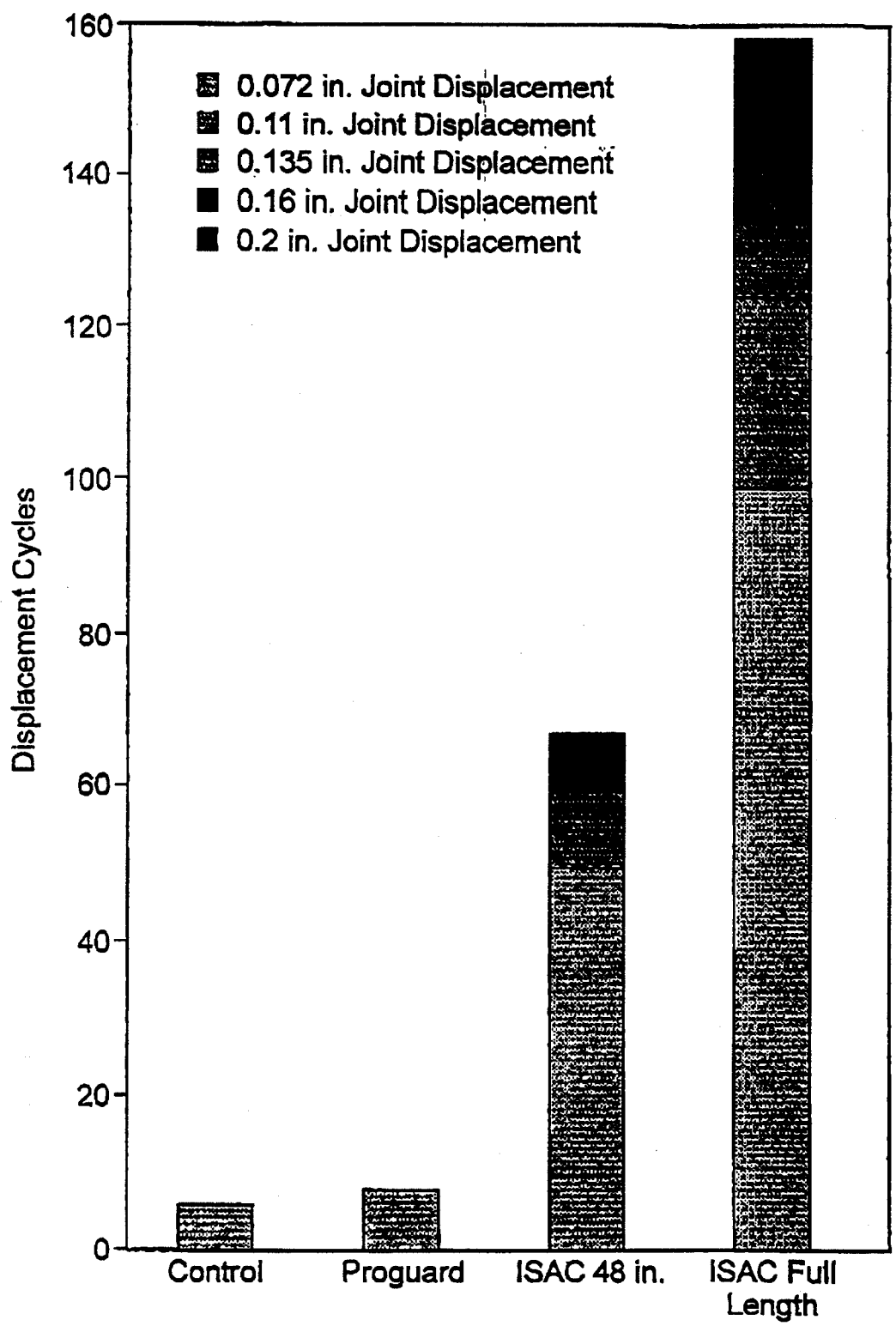
FIG. 4 shows the results of the comparative study of Example 1 in graphical form.

In the third and forth systems, the stress absorbing composite comprised the low stiffness geotextile, Amoco 4545, the high stiffness geotextile Polyfelt Bidim Rock TT 200/50 and a rubber asphalt membrane that comprised about 30% by weight of the entire membrane rubber, about 58% of the entire membrane asphalt and about 12% hydrated lime filler. The total thickness of the rubber asphalt membrane was about ⅜ inch. The systems were then subjected to various repetitive joint displacements until the overlay failed, i.e. reflective cracking occurred. The results show that the both the 48 inch and the full length stress absorbing composite of the present invention far outperformed the control and the available stress absorbing composite called Pro-guard™. Moreover, the full length stress absorbing composite outperformed the 48 inch stress absorbing composite. FIG. 4 shows the results of the above-described study in graphical form.

What is claimed is:

1. A stress absorbing composite for road repair that comprises:
    a) a low stiffness geotextile with a stiffness less than 1500 lbs/inch at 5% strain;
    b) a viscoelastic material disposed over the low stiffness geotextile; and
    c) a high stiffness geotextile with a stiffness greater than 4000 lbs/inch at 5% strain disposed over the viscoelastic material.

2. The composite of claim 1 wherein the low stiffness geotextile is a nonwoven geotextile.

3. The composite of claim 1 wherein the low stiffness geotextile is a woven geotextile.

4. The composite of claim 1 wherein the high stiffness geotextile is a nonwoven geotextile.

5. The composite of claim 1 wherein the high stiffness geotextile is a woven geotextile.

6. The composite of claim 1 wherein the composite has a thickness in the range of about 3/16 to about ⅜ in.

7. The composite of claim 1 wherein the viscoelastic material is a rubber asphalt membrane.

8. The composite of claim 7 wherein the rubber asphalt membrane is a blend of vulcanized rubber in the range of about 20% to about 30% by weight of the membrane and asphalt in the range of about 55% to about 75% by weight of the membrane, and a filler in the range of about 5% to 15%.

9. The composite of claim 8 wherein the filler is hydrated lime or calcium carbonate.

10. The composite of claim 7 wherein the rubber asphalt membrane has a thickness in the range of about 0.125 to about 0.375 in.

11. A method of retarding reflective cracking from a distressed and cracked road surface to a newly applied overlay of asphalt concrete, the method comprising the steps of:
    a) positioning a composite comprising a low stiffness geotextile with a stiffness less than 1500 lbs/inch at 5% strain;.
    a viscoelastic material disposed over the low stiffness geotextile; and
    a high stiffness geotextile with a stiffness greater than 4000 lbs/inch at 5% strain disposed over the viscoelastic material to be laid over the road surface with the low stiffness geotextile positioned adjacent to the road surface; and b) applying an asphalt concrete overlay over the composite.

12. The method of claim 11 wherein the composite is adhered to the road surface by applying a tack coat to the road surface or the low stiffness geotextile.

13. The method of claim 11 wherein the asphalt concrete overlay is adhered to the composite by applying a tack coat to the high stiffness geotextile of the composite.

14. A repaired road that comprises:

a) a distressed and cracked road surface;

b) a composite comprising a low stiffness geotextile with a stiffness less than 1500 lbs/inch at 5% strain;
a viscoelastic material disposed over the low stiffness geotextile; and
a high stiffness geotextile with a stiffness greater than 4000 lbs/inch at 5% strain disposed over the viscoelastic material to be laid over the road surface with the low stiffness geotextile positioned adjacent to the road surface; and c) an asphalt concrete overlay disposed over the composite.

15. The repaired road of claim 14 wherein the composite is adhered to the road surface by a tack coat.

16. The repaired road of claim 14 wherein the asphalt concrete overlay is adhered to the composite by a tack coat.

17. A method of retarding reflective cracking from a distressed and cracked road surface to a newly applied overlay of asphalt concrete, the method comprising the steps of:

a) positioning a low stiffness geotextile over the road surface;

b) applying a viscoelastic material over the low stiffness geotextile;

c) positioning a high stiffness geotextile over the viscoelastic material; and d) applying asphalt concrete over the high stiffness geotextile.

18. The method of claim 17 wherein the low stiffness geotextile is adhered to the road surface by applying a tack coat to the road surface or the low stiffness geotextile.

19. The method of claim 17 wherein the asphalt concrete overlay is adhered to the high stiffness geotextile by applying a tack coat to the high stiffness geotextile.

* * * * *